United States Patent [19]

Yoshida et al.

[11] Patent Number: 5,150,283
[45] Date of Patent: Sep. 22, 1992

[54] ELECTRIC DOUBLE LAYER CAPACITOR AND METHOD FOR PRODUCING THE SAME

[75] Inventors: Akihiko Yoshida, Hirakata; Kiyoaki Imoto, Takaishi, both of Japan

[73] Assignee: Matsushita Electric Industrial Co. Ltd., Kadoma, Japan

[21] Appl. No.: 676,175

[22] Filed: Mar. 28, 1991

[30] Foreign Application Priority Data

| Mar. 29, 1990 | [JP] | Japan | 2-082401 |
| May 7, 1990 | [JP] | Japan | 2-118281 |
| Jul. 6, 1990 | [JP] | Japan | 2-180002 |
| Jul. 31, 1990 | [JP] | Japan | 2-203288 |
| Oct. 25, 1990 | [JP] | Japan | 2-289155 |

[51] Int. Cl.$^5$ .................................. H01G 9/00
[52] U.S. Cl. ............................. 361/502; 29/25.03
[58] Field of Search ............... 29/25.03; 361/502; 423/447.1, 447.6; 264/29.2; 252/62.2

[56] References Cited

U.S. PATENT DOCUMENTS

| 4,327,400 | 4/1982 | Muranaka et al. | |
| 4,542,444 | 9/1985 | Boland | 361/502 |
| 4,562,511 | 12/1985 | Nishino et al. | 361/324 |
| 4,605,989 | 8/1986 | Marse et al. | 361/502 |
| 4,614,696 | 9/1986 | Ito et al. | 429/222 |
| 4,626,964 | 12/1986 | Azuma et al. | 361/502 |
| 4,633,372 | 12/1986 | Calahan et al. | 361/502 |
| 4,697,224 | 9/1987 | Watanabe et al. | 361/502 |
| 4,709,303 | 11/1987 | Fujiwara et al. | 361/502 |
| 4,717,595 | 1/1988 | Watanabe et al. | |
| 4,737,889 | 4/1988 | Nishino et al. | 361/502 |

FOREIGN PATENT DOCUMENTS

| 0112923 | 7/1984 | European Pat. Off. |
| 0187163 | 7/1986 | European Pat. Off. |
| 3530772 | 3/1986 | Fed. Rep. of Germany |
| 2040570 | 8/1980 | United Kingdom |

OTHER PUBLICATIONS

Patent Abstracts of Japan, vol. 13, No. 352, Aug. 1989; JP-A-01-112 719 (Kuraray) May 5, 1989.
Derwent Publications Ltd., JP-A-57 085 027 (Seikosha) May 5, 1982.

*Primary Examiner*—Donald A. Griffin
*Attorney, Agent, or Firm*—Cushman, Darby & Cushman

[57] ABSTRACT

An electric double layer capacitor which has a pair of polarizable electrodes, composed of electrically-conductive substrates. The substrates are coated in layers of a mixture of activated carbon with a water-soluble material-based binding agent, optionally including an agent for improving electric conductivity. The electrodes face each other interposed by a separator, and are impregnated with an electrolyte. The capacitor has the advantageous features of both conventional capacitors using an aqueous electrolyte and those capacitors using an organic solvent electrolyte; in other words, the capacitor can withstand high voltages while holding a low internal resistance.

18 Claims, 4 Drawing Sheets

ELECTRIC DOUBLE LAYER CAPACITOR AND METHOD FOR PRODUCING THE SAME

FIELD OF THE INVENTION AND RELATED ART STATEMENT

1. Field of the Invention

The present invention relates generally to an electric double layer capacitor and, in particular, with such capacitors that use activated carbon in their polarizable electrodes and the method for producing the same.

2. Description of the Related Art

The electric double layer capacitor is a capacitor of large capacitance that uses activated carbon in its polarizable electrodes and utilizes a phenomenon that electric charge is stored in an electric double layer formed between the activated carbon and an electrolyte. Conventional electric double layer capacitors may roughly be classified into the following two categories: Namely, capacitors of a first group using electrolyte of aqueous solution such as aqueous sulfuric acid, and ones of a second group using electrolyte of organic solution wherein electrolyte is dissolved in an organic solvent such as propylene carbonate.

Representative arrangements of these capacitors of the first group and the second group are schematically shown in FIGS. 4 and 5, respectively. The capacitor shown in FIG. 4 comprises a separator 41 sandwiched between two facing activated carbon powder electrodes 42, 43 being backed by two conductive electrodes 46, 40 whose fringes are abutted on annular packings of insulator rubber 44, 45. The activated carbon powder electrodes 42, 43 are prepared by compounding activated carbon powder with concentrated aqueous sulfuric acid which also serves as a binding agent for the activated carbon and by molding the prepared compound into pellets.

In contrast to this, the capacitors holding an electrolyte of an organic solvent have typical structure shown in FIG. 5. A paste consisting of activated carbon powder, a fluoride resin and methanol is extended on aluminum nets 50, 51 and dried to obtain activated carbon electrodes 52, 53 in a state of film which are then wound to a roll by interlaying a separator 54. The wound roll is thereafter impregnated with a mixed solution of propyrene carbonate and tetraethylammonium perchlorate and then housed in a container. In this figure, numerals 55, 56, 57 and 58 are an anode lead wire, a cathode lead wire, a rubber cap and aluminum container, respectively.

The conventional capacitors holding the above-described two kinds of electrolytes have the following advantages and disadvantages, respectively. The advantages inherent to ones holding the aqueous electrolyte are low electric resistance and thus suited for a load of large current discharge while the disadvantages thereof are that it is able to withstand only a low voltage, say 1.0 V which inevitably depends on decomposition voltage of the electrolyte. If one wishes to use it in a high voltage load, the use of a large number of capacitors connected in series becomes unavoidable to create a problem of reliability in long service.

On the other hand, the capacitors of the organic solvent electrolyte are advantageous in their capability of withstanding relatively high voltage (about 3 V) and thus are capable of being used in a circuit of higher voltage as compared with the ones of an aqueous electrolyte. The disadvantages are large internal resistance of the capacitors due to a high electric resistance of the electrolyte which is about 5-10 times as compared with that of the one of aqueous electrolyte and a difficulty in the use in a load of large electric current.

OBJECT AND SUMMARY OF THE INVENTION

It is therefore the primary object of the present invention to provide a capacitor which has both the advantageous features of the conventional capacitors of the aqueous electrolyte and of the organic solvent electrolyte. More particularly, it intends to realize a capacitor that withstands high voltage while holding a low internal resistance.

In accordance with the present invention which has the above-described object, there is provided an electric double layer capacitor which comprises a pair of polarizable electrodes, composed of electrically-conductive substrates coated with layers of a mixture of activated carbon with a water-soluble material-based binding agent, optionally including an agent for improving the electric conductivity of the layer, arranged so that the one faces with the other by being interposed with a separator, and an electrolyte.

In embodying the present invention, the electrically-conducting substrates may preferably be ones of plates, foils, nets, perforated plates or expanded metals of a valve action metal selected from the group consisting of aluminum, tantalum and titanium, whose surfaces may optionally be roughened by etching, and may preferably have a thickness equal to or under 50 $\mu$m.

The layer composed of activated carbon and binding agent may preferably have a thickness equal to or under 100 $\mu$m, and may be formed on the surfaces of the substrate. The activated carbon may be in any form of powder or fiber. In the case of activated carbon fiber, it may also be usable in either form of woven cloth, unwoven fabric sheet, felt or calendared paper.

The binding agent may preferably be produced from a water-soluble material which may be dehydrolyzed to become insoluble after drying. The water-soluble material may be one of polysaccharides or their derivatives.

The polysaccharides or their derivatives may be one selected from the group consisting of starch, chitin, chitosan or their derivatives, methyl cellulose, cellulose derivatives having (a) carboxyl group(s) such as carboxymethyl cellulose and carboxyethyl cellulose, hydroxyethyl cellulose, hydroxypropyl cellulose, or their derivatives.

In the case of cellulose derivatives having (a) carboxyl group(s) such as carboxymethyl cellulose and carboxyethyl cellulose, they may preferably be one(s) at least one of whose proton in their carboxyl group is substituted by any of alkali metal ion, alkaline earth metal ion, ammonium ion or aluminum ion.

Alternatively, the binding agent may be one selected from the group consisting of polyvinyl pyrolidone, polyvinyl alcohol and polyvinyl acetate, some of which may optionally be modified to be water-soluble for better dispersion in the manufacturing process.

The layers may further include an agent for improving the electric conductivity. The agent may be at least one selected from the group consisting of graphite, carbon black, acetylene black, rutenium oxide and carbon fiber, and may preferably be powder having particle diameter equal to or below 1 $\mu$m.

According to another aspect of the present invention, there is also provided a method for producing the electric double-layer capacitor which comprises, depositing a mixture prepared by dispersing activated carbon powder and an agent for improving the electric conductivity of the layer, in an aqueous solution of methyl cellulose or carboxymethyl cellulose, on an alminum substrate by either one means of spreading, impregnating and printing; drying the substrates with the layer of the deposited mixture; and then arranging the dried substrates so that the substrate face with each other by interlaying a separator therebetween.

In the stated method, either one of alcohol and ammonia may preferably be added at any of said dissolving, mixing or dispersing step.

Alternatively, the electric double layer capacitor of the present invention may be one which comprises; a polarizable electrodes composed of activated carbon and a binding agent, and having a volumetric filling factor equal to or above 0.4 (activated carbon/binding agent), an electrically-conductive electrode, separators, and an electrolyte. It is appreciated that the stated value (no less than 0.4) of the volumetric filling facter is preferred for optimum electric conductivity.

By embodying the present invention, the internal resistance of the obtained capacitor can be made extremely small because the invention provides an activated carbon electrode structure including a composition of a low electric resistance which gives, a property of excellent electrically-contacting with the electrically-conductive substrates as well as property of good film-forming and self-supporting to the activated carbon layer.

Furthermore, since the thickness of the activated carbon layer of the activated carbon electrode composition of the present invention can be made extremely small, a capacitor of a large capacitance and of a low electrical resistance in view of geometrical space factor of the electrode (i.e. large surface area of the electrodes containable in a given unit volume, obtained by laminating a number of thin layers) is made readily available.

BRIEF EXPLANATION OF THE DRAWING

The foregoing and other characteristics of the present invention will be made clearer by the following detailed description of a preferred embodiment thereof given by way of non-limiting example, and by the annexed drawing, wherein.

It will be recognized that some or all of the Figures are schematic representations for purposes of illustration and do not necessarily depict the actual relative sizes or locations of the elements shown.

DESCRIPTION OF THE PREFERRED EMBODIMENTS

EXAMPLE 1

Ten parts by weight of activated carbon powder (specific surface area: 2000 $m^2/g$, mean particle diameter: 2 $\mu m$) and 2 parts by weight of acetylene black were uniformly dispersed in a mixed solution of water and methanol. Apart from this, 2 parts by weight of carboxymethyl cellulose (CMC), whose protons in their carboxyl groups were partly substituted by Na ions, were dissolved in water. Both of the dispersion and the solution were then combined to be mixed together by stirring to give an activated carbon slurry. Thereafter, obtained slurry was deposited by dipping on the both sides of an aluminum foil 1 (width: 10 mm, length: 40 mm, thickness: 20 $\mu m$), whose surface was roughened beforehand by chemical etching. After drying in the air for 30 min., the deposited foil was dried by applying infra-red ray at 100° C. for 60 min. to give activated carbon electrodes 2 and 3 having the superimposed layer of thickness: 50 $\mu m$. Incidentally, it was found that a favorable result was obtained if this thickness was equal to or under 100 $\mu m$.

Figure 1:
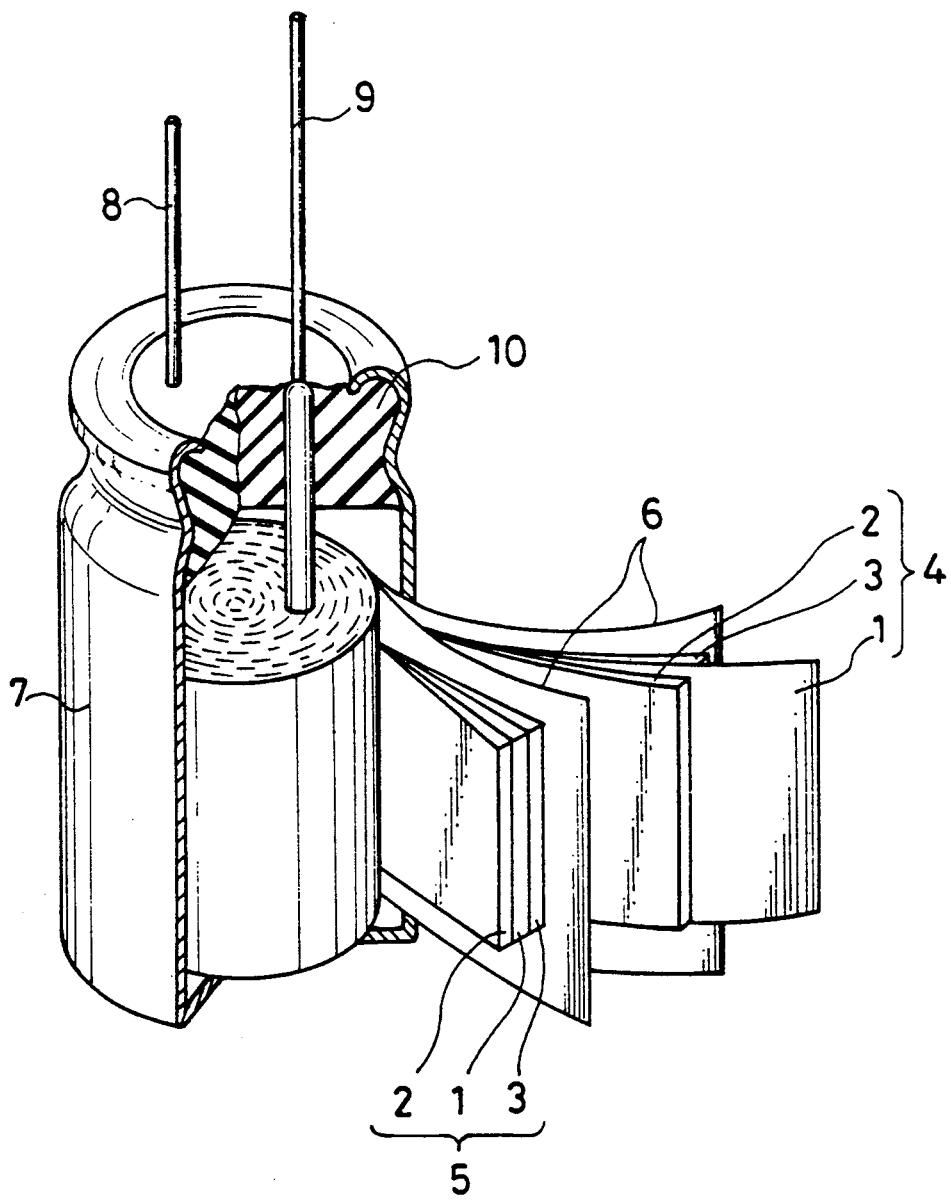
FIG. 1 is a schematic perspective view, partly cutout, of an example of a capacitor built in accordance with the present invention.

A pair of the obtained foil electrodes 4 and 5 were wound interlaying a separator 6 therebetween. The wound body was then impregnated with an electrolyte prepared by dissolving tetraethylammonium tetrafluoroborate in propylene carbonate in 1 mol/l. Thereafter, the impregnated body was housed in an aluminum case 7 with aluminum lead wires 8 and 9, and a rubber packing 10, as illustrated by FIG. 1.

EXAMPLE 2

A capacitor, whose structure and composition were the same as that of EXAMPLE 1 except for omission of acetylene black, was prepared.

EXAMPLE 3

A capacitor, whose structure and composition were the same as that of EXAMPLE 1 except for the use of CMC whose protons in their carboxyl groups were partly substituted by $NH_4$ ions instead of Na ions, was prepared.

EXAMPLE 4

A capacitor, whose structure and composition were the same as that of EXAMPLE 1 except for the use of chopped phenolic resin-based activated carbon fiber (fiber diameter: 10 $\mu m$, mean chop length: 0.5 $\mu m$, specific surface area: 2300 $m^2/g$) instead of the activated carbon powder, was prepared.

EXAMPLE 5

A capacitor, whose structure and composition were the same as that of EXAMPLE 1 except for the use of rutenium oxide powder (mean particle diameter: 0.5 $\mu m$) instead of acetylene black, was prepared.

EXAMPLE 6

Ten parts by weight of activated carbon powder (specific surface area: 2000 $m^2/g$, mean particle diameter: 2 $\mu m$) and 2 parts by weight of acetylene black were uniformly dispersed in aqueous ammonia (concentration: 5% by weight). Apart from this, 2 parts by weight of carboxymethyl cellulose (CMC), whose protons in their carboxyl groups were partly substituted by Na ions, were dissolved in water. Both of the dispersion and the solution were then combined to be mixed together by stirring to give an activated carbon slurry. Thereafter, the obtained slurry was deposited by a roll coater on the both sides of an aluminum foil of thickness: 20 $\mu m$, whose surface was roughened beforehand by chemical etching. After drying in the air for 30 min., the deposited foil was dried by applying far infra-red ray at 100° C. for 60 min. to give activated carbon electrodes.

Figure 2:
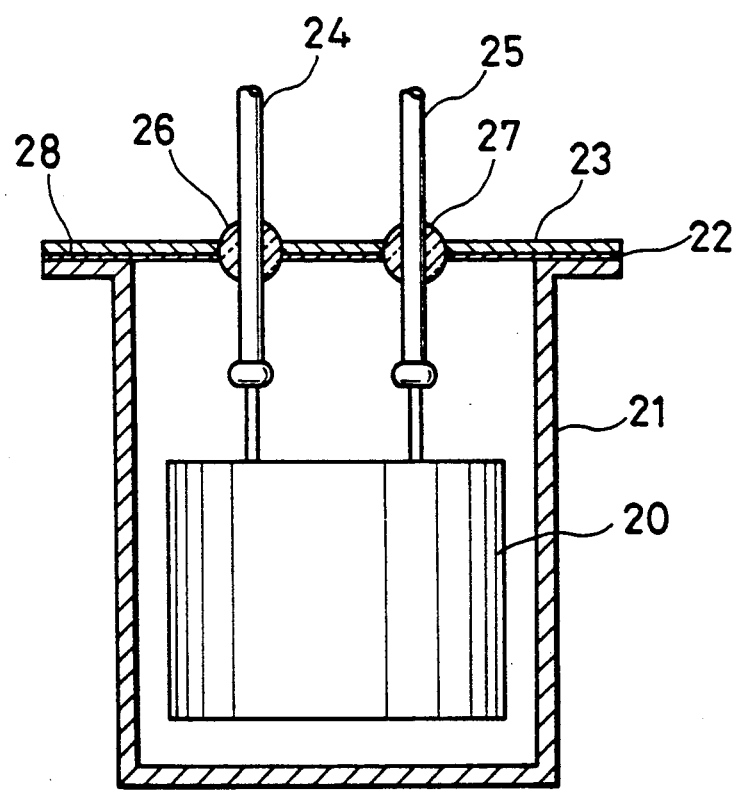
FIGS. 2 and 3 are side cross-sectional views of the other embodiments, respectively.

A pair of the obtained foil electrodes were wound interlaying a separator therebetween to give an electrode body 20 shown in FIG. 2. The electrode body was then impregnated with an electrolyte prepared by dissolving tetraethylammonium tetrafluoroborate in propylene carbonate in 1 mol/l. And then the impregnated body was housed in a stainless steel case 21 with a stainless steel lid 23 having an aluminum layer 22 to complete a hermetically-sealed element. In the hermetically sealed element, both of positive/negative aluminum lead wires 24 and 25 were sealed with glass eyelets 26 and 27 which were strongly bonded to the lid 23, and the lid 23 was welded to the case 21 at their joint 28.

EXAMPLE 7

Figure 3:
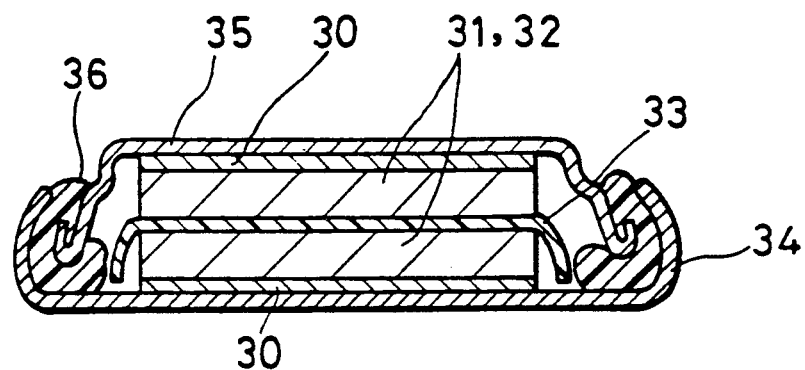
Figure 4:
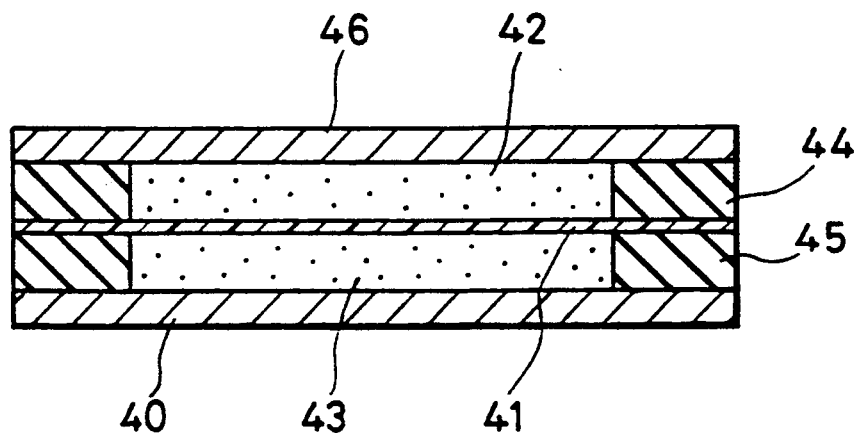
FIGS. 4 and 5 are schematic views of conventional capacitors.
Figure 5:
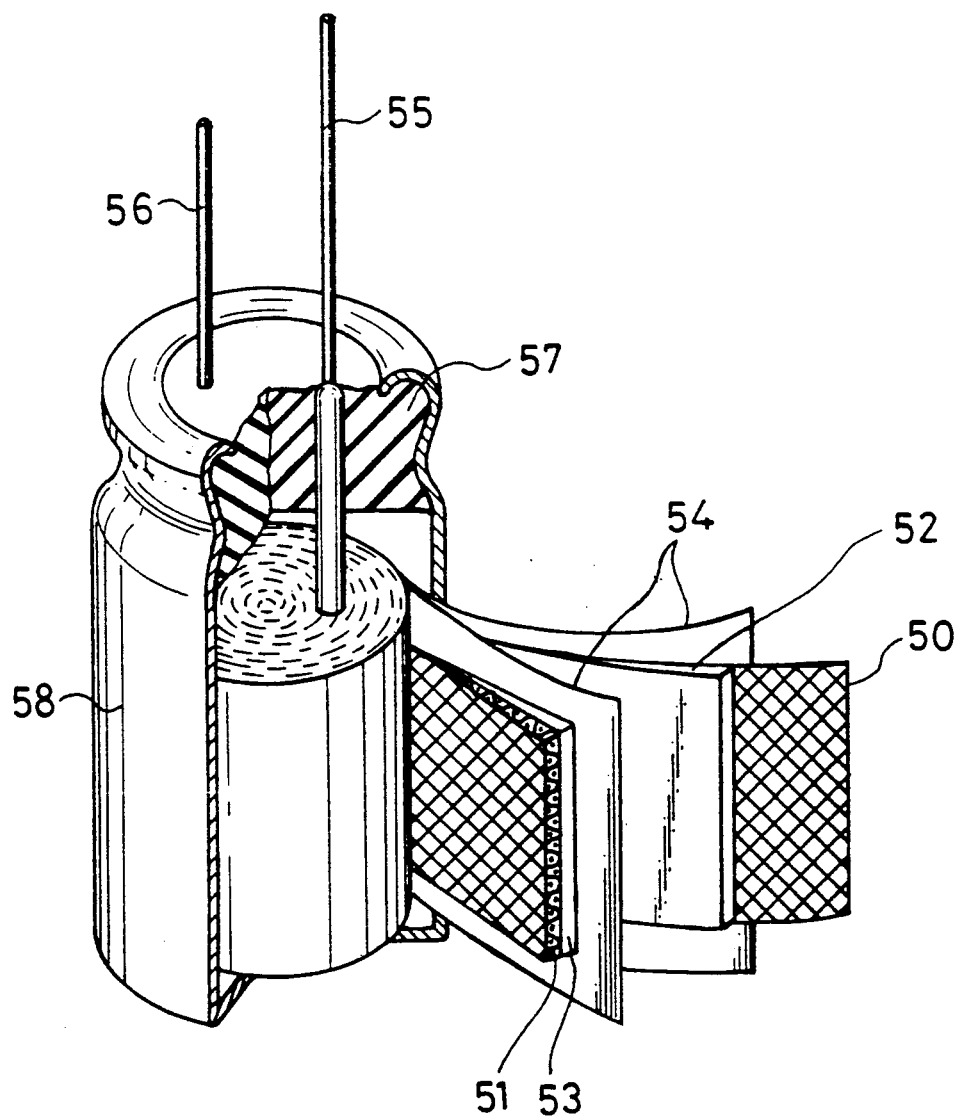

Ten parts by weight of activated carbon fiber chop (specific surface area: 2500 m$^2$/g, mean length: 2 μm, fiber diameter: 8 μm) and 2 parts by weight of acetylene black were uniformly dispersed in a mixed solution of water and alcohol. Apart from this, 2 parts by weight of carboxymethyl cellulose (CMC), whose protons in their carboxyl groups were partly substituted by Na ions, were dissolved in water. Both of the dispersion and the solution were then combined to be mixed together by stirring to give an activated carbon slurry. Thereafter, the obtained slurry was deposited by printing method on one side of an aluminum foil 30 shown in FIG. 3 of thickness: 20 μm, whose surface was roughened beforehand by chemical etching. After drying in the air for 30 min., the deposited foil was dried by applying far infrared ray at 100° C. for 60 min. to give activated carbon electrodes 31 and 32, which were then shaped to discs of diameter: 15 mm.

A pair of the obtained disc electrodes were combined together interlaying a separator 33 therebetween to give an electrode body which was then impregnated with an electrolyte prepared by dissolving tetraethylammonium tetrafluoroborate in propylene carbonate in 1 mol/l. Thereafter the impregnated body was housed in a pair of cases 34 and 35 with a gasket 36 to complete a capacitor of a coin type.

The ratings and other characteristics of the capacitors built in accordance with the above examples are determined as shown in TABLE below, in comparison with those (indicated by C.E. in the table) determined with the capacitors obtained by the comparative experiments.

TABLE

| Invention: | Capacitance F or sec | Impedance 120 Hz | Impedance 1 KHz | DC Resistance Ω | Reliability (−ΔC) % |
|---|---|---|---|---|---|
| EXAMPLE 1 | 8 sec. | 0.3 | 0.3 | 0.2 | 5 |
| EXAMPLE 2 | 8.2 sec. | 0.35 | 0.35 | 0.25 | 6 |
| EXAMPLE 3 | 8 sec. | 0.35 | 0.35 | 0.22 | 4 |
| EXAMPLE 4 | 9 sec. | 0.4 | 0.38 | 0.3 | 6 |
| EXAMPLE 5 | 8 sec. | 0.4 | 0.4 | 0.22 | 4 |
| EXAMPLE 6 | 8 sec. | 0.3 | 0.3 | 0.2 | 3 |
| EXAMPLE 7 | 0.3 F | 1.0 | 1.0 | 0.2 | 2 |
| Prior Art: | | | | | |
| C.E. 1 | 4 sec. | 2 | 1 | 2 | 30 |
| C.E. 2 | 0.3 F | 20 | 10 | 2 | 15 |
| C.E. 3 | 6 sec. | 0.3 | 0.3 | 0.2 | 40 |

The capacitor indicated by C.E. 1 in the above table is a wound one which has a layer (thickness: 200 μm) composed of activated carbon and water-insoluble organic binding agent (fluorine containing synthetic resin), deposited on one side of an aluminum foil of thickness: 60 μm, which is housed in a container of the same volume as that of EXAMPLE 1. The capacitor indicated by C.E. 2 is a coin type capacitor having a polarizable electrode composed of a woven cloth of activated carbon fiber. The capacitor indicated by of C.E. 3 is a capacitor with sulfuric acid electrolyte.

In the above table, the capacitances of EXAMPLES 1–6 and C.E. 1 are indicated by the time period in second until the time points at which cell voltages reach 1 V at a discharging rate of 100 mA, and those of the others are indicated in Farad unit. The reliabilities are indicated by % of the decrease in the capacitance after the load test of 1.8 V for 1000 hours.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electric double layer capacitor comprising:
    a pair of polarizable electrodes having electrically-conductive substrates coated with layers made of a mixture of activated carbon and at least one of polysaccharides and their derivatives which acts as a binding agent,
    a separator interposed between said polarizable electrodes which are facing one other, and
    an electrolyte.

2. The electric double layer capacitor as claimed in claim 1, wherein said polysaccharide is selected from the group consisting of starch, chitin, chitosan or their derivatives.

3. A method for producing an electric double layer capacitor comprising the steps of:
    depositing a mixture on aluminum substrates by means of one of painting, impregnating, printing spin coating, and doctor-blade coating, said deposited mixture prepared by dispersing activated carbon in one of an aqueous solution of at least one of the group consisting of methyl cellulose, cellulose each having (a) carboxyl group(s), their derivatives, hydroxyethyl cellulose, hydroxypropyl cellulose and their derivatives, and a solution prepared by dissolving polysaccharides in one of water and an aqueous acid;
    drying the aluminum substrates with the deposited mixture; and
    interposing separators between the dried aluminum substrates with the deposited mixture, said dried aluminum substrates facing each other.

4. The method for producing electric double layer capacitor as claimed in claim 3, wherein said mixture prepared by the dispersion further includes an agent for improving electric conductivity.

5. The method for producing an electric double layer capacitor as claimed in claim 3, wherein one of alcohol and ammonia is added at said dissolving, mixing or dispersing step.

6. An electric double layer capacitor comprising:
    a pair of polarizable electrodes having electrically-conductive substrates each being coated with layers made of a mixture of activated carbon and at least one binding agent selected from the group consisting of methyl cellulose, cellulose each having (a) carboxyl group(s), their derivatives, hydroxyethyl cellulose, hydroxypropyl cellulose and their derivatives;

a separator interposed between said polarizable electrodes, said polarizable electrodes facing each other; and an electrolyte.

7. The electric double layer capacitor as claimed in any one of claims 1 or 6, wherein said layers coated on said electrically-conductive substrate further include an agent for improving electric conductivity.

8. The electric double layer capacitor as claimed in claim 7, wherein said agent for improving electric conductivity is at least one selected from the group consisting of graphite, carbon black, acetylene black, rutenium oxide and carbon fiber.

9. The electric double layer capacitor as claimed in claim 8, wherein said agent for improving electric conductivity is powder having particle diameter equal to or less than 1 $\mu$m.

10. The electric double layer capacitor as claimed in any of claims 1 or 6, wherein said electrically-conducting substrates are one of plates, foils, nets, perforated plates, and expanded metals of a valve action metal selected from the group consisting of aluminum, tantalum and titanium, whose surfaces are optionally etched.

11. The electric double layer capacitor as claimed in any of claims 1 or 6, wherein said activated carbon is in one of powder and fiber form.

12. The electric double layer capacitor as claimed in claim 11, wherein said activated carbon fiber is in a form of chopped fiber.

13. The electric double layer capacitor as claimed in claim 6, wherein said cellulose derivatives having (a) carboxyl group(s) have at least one proton in their carboxyl group substituted by any one of alkali metal ion, alkaline earth metal ion, ammonium ion and aluminum ion.

14. The electric double layer capacitor as claimed in any of claims 1 or 6, wherein said electrically-conductive substrates have a thickness equal to or less than 50 $\mu$m.

15. The electric double layer capacitor as claimed in any of claims 1 or 6, wherein said layer composed of activated carbon and a binding agent has a thickness equal to or less than 50 $\mu$m.

16. The electric double layer capacitor as claimed in any of claims 1 or 6, wherein said layer composed of activated carbon and a binding agent is formed on either one or both of the surfaces of said substrate.

17. An electric double layer capacitor in accordance with claim 6, wherein said cellulose and cellulose derivatives each having (a) carboxyl group(s) is of one of carboxymethyl cellulose and carboxyethyl cellulose.

18. An electric double layer capacitor as claimed in any one of claims 1 or 6 having a volumetric filling factor equal to or greater than 0.4.

* * * * *